(12) United States Patent
Peterson

(10) Patent No.: US 7,942,069 B2
(45) Date of Patent: May 17, 2011

(54) FLUID HANDLING DEVICE WITH ISOLATING CHAMBER

(75) Inventor: Thomas Peterson, Chanhassen, MN (US)

(73) Assignee: Entegris, Inc., Billerica, MA (US)

( * ) Notice: Subject to any disclaimer, the term of this patent is extended or adjusted under 35 U.S.C. 154(b) by 224 days.

(21) Appl. No.: 12/281,941

(22) PCT Filed: Mar. 8, 2007

(86) PCT No.: PCT/US2007/005907
§ 371 (c)(1),
(2), (4) Date: Dec. 10, 2008

(87) PCT Pub. No.: WO2007/103486
PCT Pub. Date: Sep. 13, 2007

(65) Prior Publication Data
US 2009/0127483 A1     May 21, 2009

Related U.S. Application Data

(60) Provisional application No. 60/780,537, filed on Mar. 9, 2006.

(51) Int. Cl.
*G01F 1/37* (2006.01)
*G01F 1/34* (2006.01)
*G01L 15/00* (2006.01)
*G01L 9/04* (2006.01)

(52) U.S. Cl. ............. 73/861.52; 73/861.42; 73/716; 73/720

(58) Field of Classification Search ................ None
See application file for complete search history.

(56) References Cited

U.S. PATENT DOCUMENTS

| 4,774,843 | A | * | 10/1988 | Ghiselin et al. ............... 73/727 |
| 4,994,781 | A |   | 2/1991  | Sahagen |
| 5,174,926 | A | * | 12/1992 | Sahagen .............. 252/519.13 |
| 5,744,726 | A |   | 4/1998  | Maurer |
| 7,292,945 | B2 | * | 11/2007 | Wargo et al. ................. 702/50 |
| 7,422,028 | B2 | * | 9/2008  | Nugent et al. ............... 137/487 |
| 7,447,600 | B2 | * | 11/2008 | Wargo et al. ................. 702/50 |
| 7,530,278 | B2 | * | 5/2009  | Litecky et al. ........... 73/861.53 |
| 2003/0046983 | A1 |   | 3/2003 | Sato et al. |

* cited by examiner

*Primary Examiner* — Harshad Patel
(74) *Attorney, Agent, or Firm* — Patterson Thuente Christensen Pedersen, P.A.

(57) ABSTRACT

A fluid handling device includes a body portion defining a flow passage and an impulse chamber extending from the flow passage. The impulse chamber is fluidly coupled with the flow passage and has a pair of opposing ends defining a length dimension therebetween. The impulse chamber further presents a diameter dimension transverse to the length dimension, wherein the length dimension is at least 3 times and not greater than 10 times the diameter dimension. The device further includes at least one sensor operably coupled with the body portion. The sensor is disposed proximate the end of the impulse chamber opposite the flow passage and presents a sensing face facing into the impulse chamber.

20 Claims, 8 Drawing Sheets

FLUID HANDLING DEVICE WITH ISOLATING CHAMBER

RELATED APPLICATIONS

This application claims the benefit of U.S. Provisional Patent Application No. 60/780,537, filed Mar. 9, 2006, and entitled FLOW MEASURING DEVICE BODY, hereby fully incorporated herein by reference.

FIELD OF THE INVENTION

This invention relates to fluid flow measurement and control devices. Specifically, it is directed to flow meters and controllers suitable for critical process fluid handling equipment.

BACKGROUND OF THE INVENTION

Ultra-pure fluids including de-ionized water are frequently used for processing of sensitive materials such as semi-conductor substrates. The susceptibility to contamination of the sensitive materials during the manufacturing process is a significant problem faced by manufacturers. The sensitive materials under process are often in direct contact with the ultra-pure fluids. Hence, contamination of the ultra-pure fluids often results in contamination of the materials under process. Various components of these manufacturing systems, such as flow meters and controllers have been designed to reduce the contamination of the ultra-pure fluids (and therefore the sensitive materials under process) by reducing the harboring of foreign particles, and by preventing the growth of bacteria through elimination or reduction of stagnant flow regions within the fluid delivery system.

Flow meters and controllers typically require the measurement of fluid pressure on either side of an orifice in the fluid flow path. The differential in measured pressure is used to calculate the fluid flow rate. Conventional fluid pressure measurements are obtained by tapping the flow line at the desired location and putting the tap in fluid communication with a pressure sensor. To prevent the formation of stagnant flow regions that harbor particulates and facilitate bacterial growth, pressure tap geometries having a small "aspect ratio" (length over diameter) are used. A tap geometry that is shallow with respect to the penetration diameter tends to be swept clean by the process flow, and is less likely to promote bacterial growth or harbor particulates. Further, devices for ultra-pure process flows are typically flushed with process fluid flow for a period of time upon initial installation, during which time the actual process is out of operation. It is desirable that regions out of the direct fluid flow be kept to a minimum to enable quick flushing and removal of contaminants. Hence, conventional design favors a pressure tap with a pressure sensor that is closely coupled to the wall of the flow passage. Preferably, the sensing face of the pressure sensor is flush with the wall of the flow passage.

Flow controllers, such as those manufactured by Entegris NT (owner of the present application) and disclosed in U.S. Pat. No. 6,578,435 hereby fully incorporated herein by reference, commonly use ceramic pressure sensors that are in direct contact with the process medium. These ceramic sensors, however, are not well suited for contact with caustic fluids. Direct contact of the pressure sensor with the process medium is preferred over arrangement wherein an isolating diaphragm is interposed between the sensor and the process fluid in part because direct contact enhances the responsiveness of the measurement, and reduces other secondary effects (e.g. hysteresis) associated with isolation techniques. As a result, sapphire or other such inert materials are often used with caustic fluids. Such a sensor is disclosed, for example, in U.S. Pat. No. 6,612,175, which is owned by the owner of the present invention and is hereby fully incorporated herein by reference.

Applicant has discovered, however, that sapphire sensors are susceptible to bias errors and signal noise due to thermal effects when they are positioned with the sensing face flush with the wall of the flow passage. Particularly in integrated flow controllers wherein a motor operated valve is disposed in the same body with the flow metering sensors, it is believed that heat from the motor is conducted both through the valve body and the fluid itself to reach the sensors. The sensor located closest to the valve motor will be at a generally higher temperature than the sensor located further away due to conduction through the valve body. Further, differential temperatures may exist along the length of the portion of the sensor disposed in the valve body due to conduction through the valve body. Heat may be conducted through the fluid, even upstream against the flow direction in very low fluid flow applications, for example lower than about 250 mL/min. The thermal resistance of the fluid may result in differential fluid temperatures at the sensor faces causing a bias. Further, flow turbulence and differential heating at the fluid to valve body interface may result in pockets of fluid at differing temperatures. The pockets of fluid at differing temperatures may contact the sensor faces, resulting in rapid output signal variations.

What is needed in the industry are flow metering and controlling devices wherein sapphire sensors may be placed in direct contact with a process fluid while avoiding undesirable signal bias and noise from thermal effects, while simultaneously avoiding regions of stagnant fluid harboring particulates and facilitating bacterial growth.

SUMMARY OF THE INVENTION

Embodiments of the present invention address the need of the industry for flow metering and controlling devices wherein sapphire or other sensors may be placed in direct contact with a process fluid while avoiding undesirable signal bias and noise from thermal effects, while simultaneously avoiding regions of stagnant fluid harboring particulates and facilitating bacterial growth. According to embodiments of the invention, the face of a sapphire sensor is isolated from the flow stream with an impulse chamber or tube. In one embodiment, fluid communication between the sensor and the flow passage is provided through an impulse chamber having an aspect ratio (that is, the ratio of the length of the chamber to diameter of the chamber), not less than about 3 to 1 and not greater than about 10 to 1.

In another embodiment, the offset structure further includes a sensing chamber interposed between the sensor face and the impulse chamber, having a larger hydraulic diameter than the impulse chamber. The volume of the sensing chamber is defined by a cavity in fluid communication with the impulse chamber, bounded by the face of the sensor. The ratio of the volume of the sensing chamber to the volume of the impulse chamber does not exceed 0.3.

It is believed that, in embodiments of the invention, conduction of heat through the process fluid is reduced due to the relatively smaller cross-sectional area dimension and additional length of heat transfer path through the fluid from the heat source to the sensor face. Further, the impulse chamber results in relatively less fluid turbulence and correspondingly less rapid fluid temperature variation at the sensor face. Moreover, conduction of heat through the body of the device is reduced due to the longer heat flow path through the body. These reductions of heat flow through the fluid and device body result in alleviation of signal bias and noise.

Accordingly, an advantage of embodiments of the invention incorporating an impulse chamber having the above described range of aspect ratios is that it provides improved thermal isolation of the sensor from the turbulent mixing of the flow stream, while allowing adequate flushing of the impulse chamber during initial operation and use.

Another advantage of embodiments of the invention incorporating an impulse chamber having the above described range of aspect ratios is that, in a fluoropolymer device body, the sensors are further isolated from heat conduction through the device body.

An advantage of embodiments of the invention including a sensing chamber with the above characteristics is that it accommodates sensor diameters that may be of larger hydraulic diameter than a practicable impulse chamber, while not enabling excessive particle harboring or bacterial growth.

Accordingly, in an embodiment, a fluid handling device includes a body portion defining a flow passage and an impulse chamber extending from the flow passage. The impulse chamber is fluidly coupled with the flow passage and has a pair of opposing ends defining a length dimension therebetween. The impulse chamber further presents a diameter dimension transverse to the length dimension, wherein the length dimension is at least 3 times and not greater than 10 times the diameter dimension. The device further includes at least one sensor operably coupled with the body portion. The sensor is disposed proximate the end of the impulse chamber opposite the flow passage and presents a sensing face facing into the impulse chamber.

In embodiments of the device, the body portion may further define a sensing chamber at the end of the impulse chamber opposite the flow passage. The impulse chamber may define a first volume and the sensing chamber may define a second volume, wherein the second volume is not more than 30% of the first volume.

In embodiments of the device, the body portion may further define a second impulse chamber spaced apart from the first impulse chamber. The second impulse chamber extends from the flow passage and is fluidly coupled therewith. The second impulse chamber has a pair of opposing ends defining a length dimension therebetween and further presenting a diameter dimension transverse to the length dimension, such that the length dimension is at least 3 times and not greater than 10 times the diameter dimension. The device may further include a second sensor operably coupled with the body portion and disposed proximate the end of the second impulse chamber opposite the flow passage.

Embodiments may further include a method of simultaneously alleviating thermally induced bias and signal noise while inhibiting particulate harboring and bacterial growth in a fluid handling device. The method includes providing a body portion, and defining a flow passage and a pair of spaced apart impulse chambers fluidly coupled with the flow passage in the body portion. Each of the impulse chambers have a pair of opposing ends defining a length dimension therebetween and presenting a diameter dimension transverse to the length dimension, such that the length dimension is at least 3 times and not greater than 10 times the diameter dimension. A sensor is disposed proximate the end of each one of the impulse chambers opposite the flow passage. Further, a sensing chamber may be defined in the body portion adjacent the end of each of each of the impulse chambers opposite the flow passage. The impulse chambers and the sensing chambers may be defined such that a volume of each sensing chamber is not more than 30% of a volume of the adjacent impulse chamber.

Other advantages of the present invention will be readily apparent to those skilled in the art from a review of the following detailed description of the preferred embodiments especially when considered in conjunction with the claims and accompanying drawings.

DETAILED DESCRIPTION OF THE PREFERRED EMBODIMENTS

Figure 1:
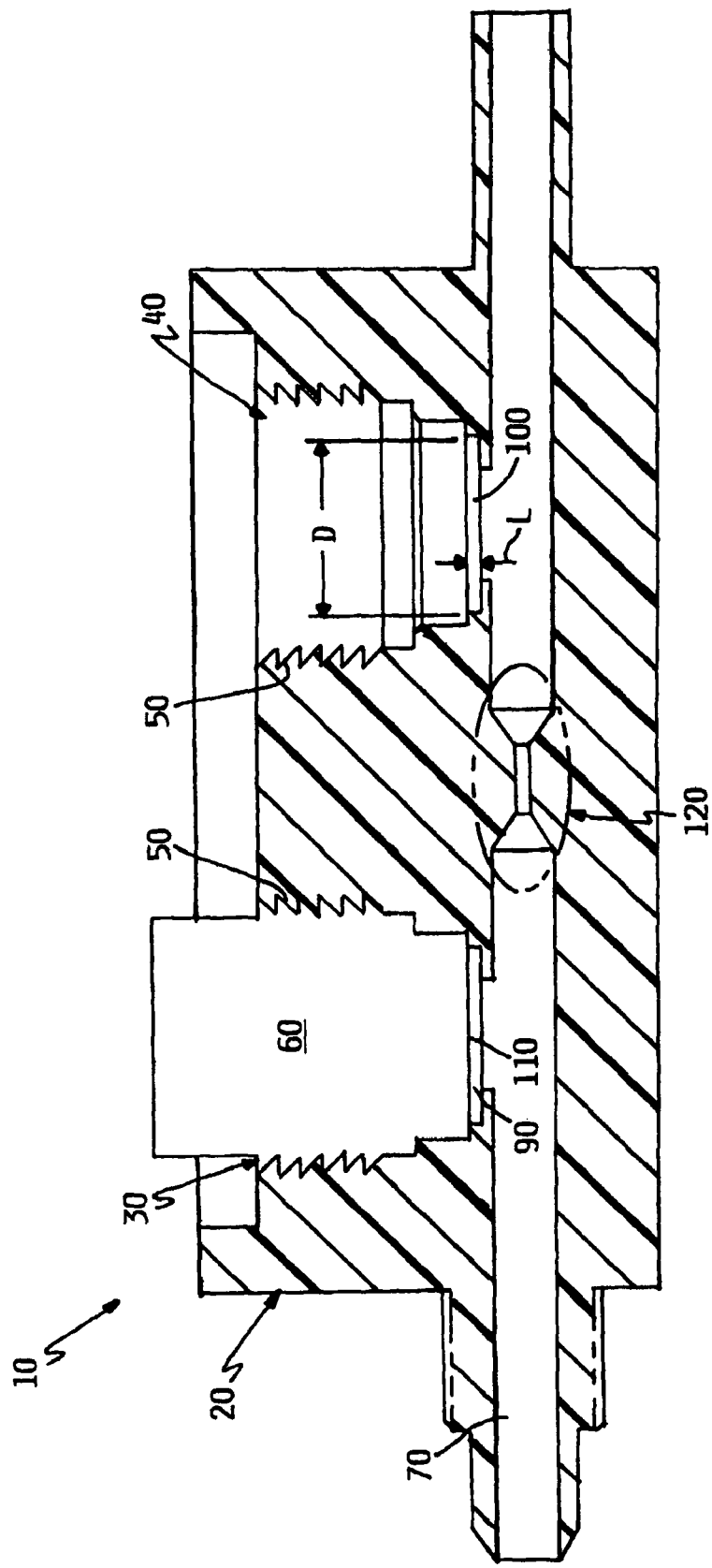
FIG. 1 depicts a prior art obstruction type flow meter body in cross-section.

Referring to FIG. 1, the body 20 of a prior art orifice-type flow meter 10 is shown in cross-section. As discussed in the Background, this design features recesses 30, 40 that are formed with threaded walls 50 to engage a pressure sensor 60 (second pressure sensor not shown). Each recess 30 and 40 is in fluid communication with a flow passage 70 through orifices 90, 100, respectively. The orifices 90 and 100 are characterized by an aspect ratio AR (axial length L to diameter D) on the order of 0.1. Looking at recess 30, a sensing face 110 of the pressure sensor 60 is closely coupled to the flow passage 70 through the orifice 90.

The aspect ratio of the design in FIG. 1 balances thermal isolation of the sensor with the conflicting design consideration that the depth of any offset between the flow passage 70 and the sensor face 110 should be shallow to reduce areas of stagnant flow that both harbor bacterial growth and particulates and are difficult and time consuming to flush of contaminants when the device is initially placed in service.

Figure 2:
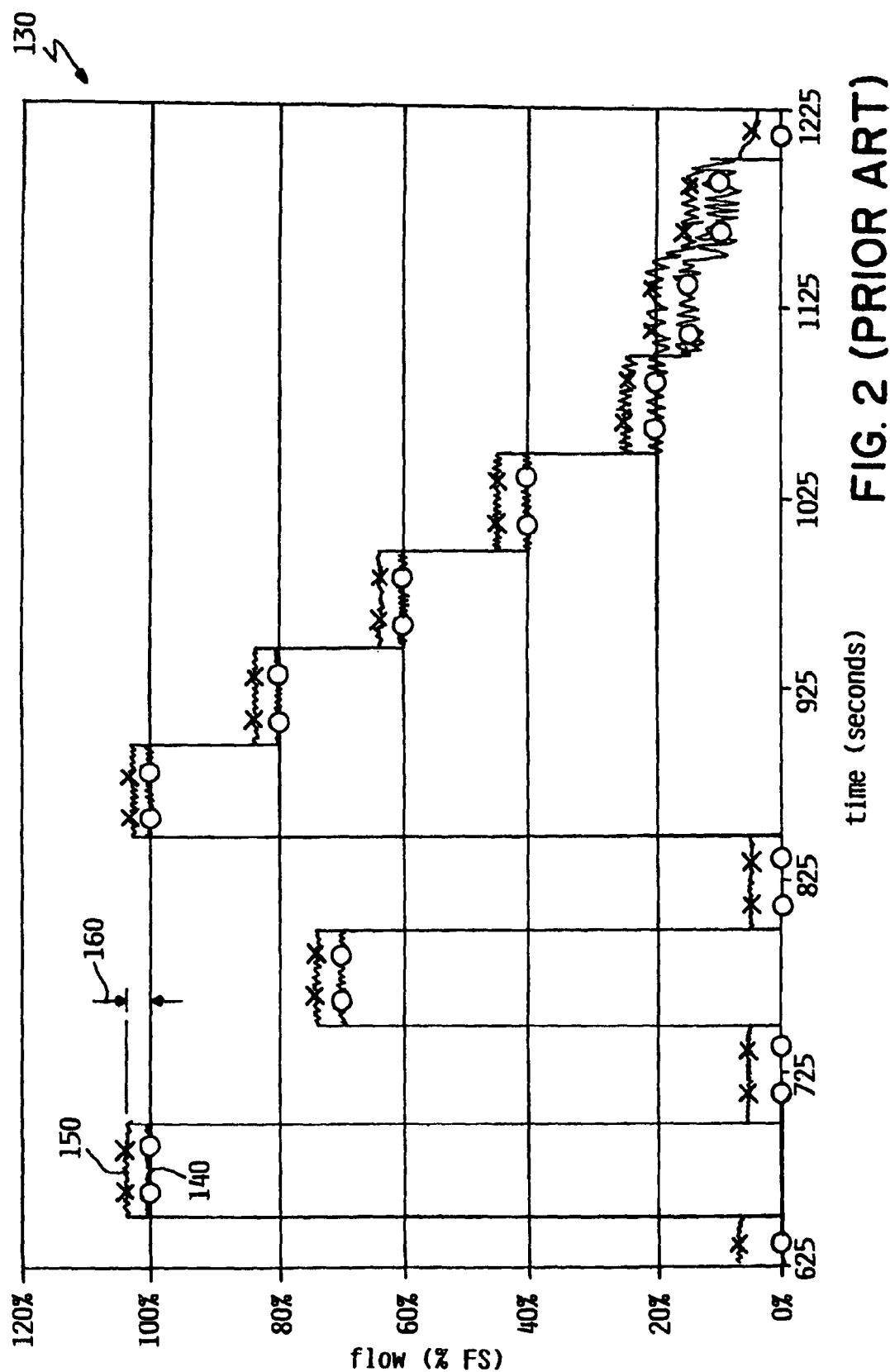
FIG. 2 is a graph depicting data from a cascade test using the flow meter body of FIG. 1.
Figure 8:
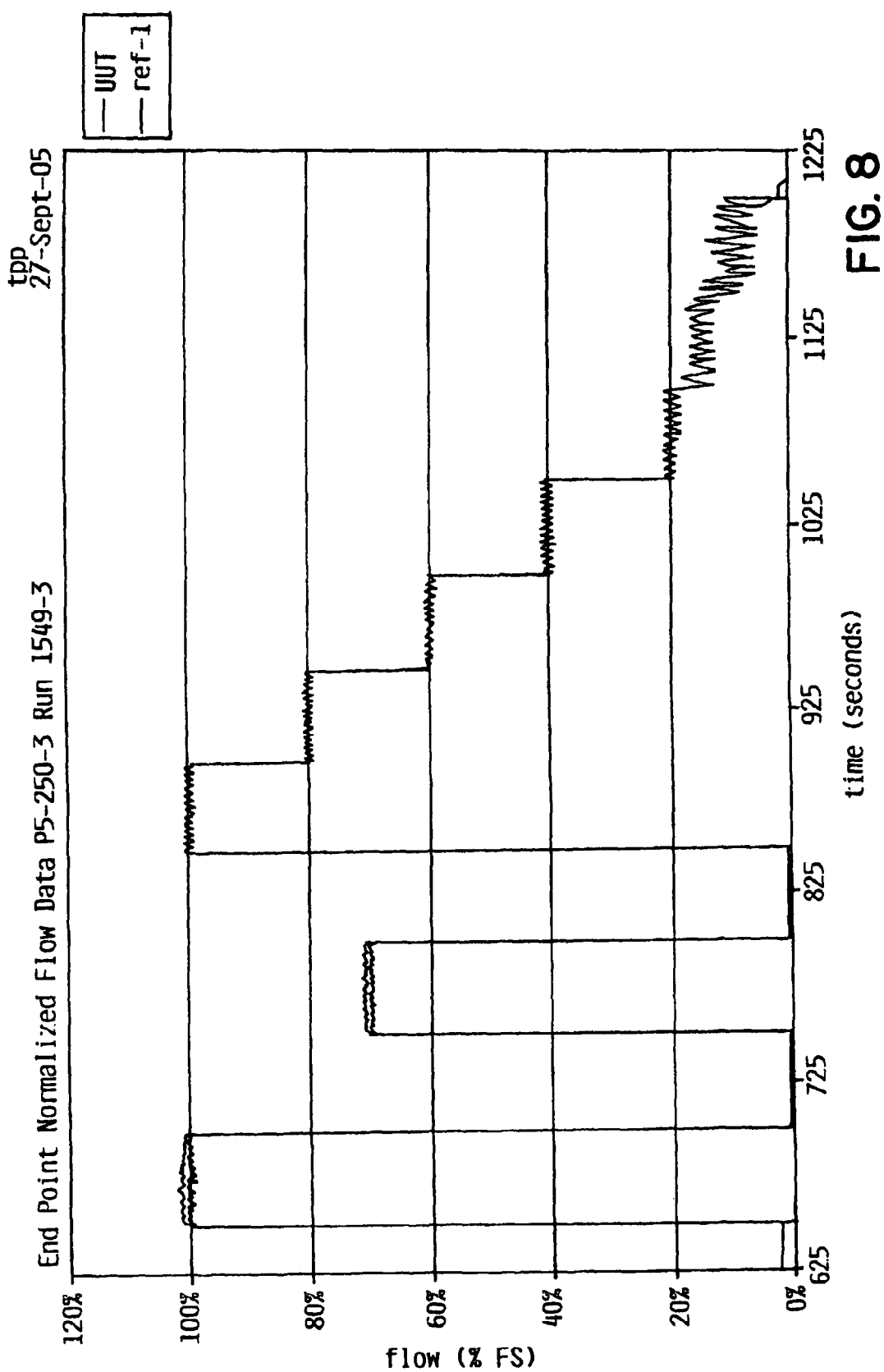
FIG. 8 is a graph depicting end point normalized data from a cascade test using the flow meter body of FIG. 1.

As mentioned previously, when sapphire pressure sensors are used in the prior art FIG. 1 design, the resulting flow measurement, which is determined by measuring the pressure difference across an obstruction 120, is subject to a temperature-induced bias error. Referring to FIG. 2, the results of a cascade test of the prior art device are shown in a graph 130. The results are presented in percent of full scale of the flow meter 10. The cascade test consisted of setting the flow rate of a caustic fluid through the flow meter 10 of FIG. 1 according to the following schedule: 0%, 100%, 0%, 70%, 0%, 100%, 80%, 60%, 40%, 20%, 15%, 10%, and 0% of the full scale of the flow meter 10. Each flow rate was maintained for a period of 50 seconds before moving to the next flow rate in the schedule. Data point set 140, delineated with "O" symbols, represents the actual flow rate. Data point set 150, delineated with the "X" symbols, represents the flow as measured by the flow meter 10 using sapphire strain-gauge pressure sensors to measure the pressure drop across the obstruction 120. The graph 130 of FIG. 2 clearly shows bias errors (e.g. numerical reference 160). Moreover, signal noise is apparent, particularly at flow rates below 20%, as also shown by the end point normalized flow data graph of FIG. 8.

Figure 3:
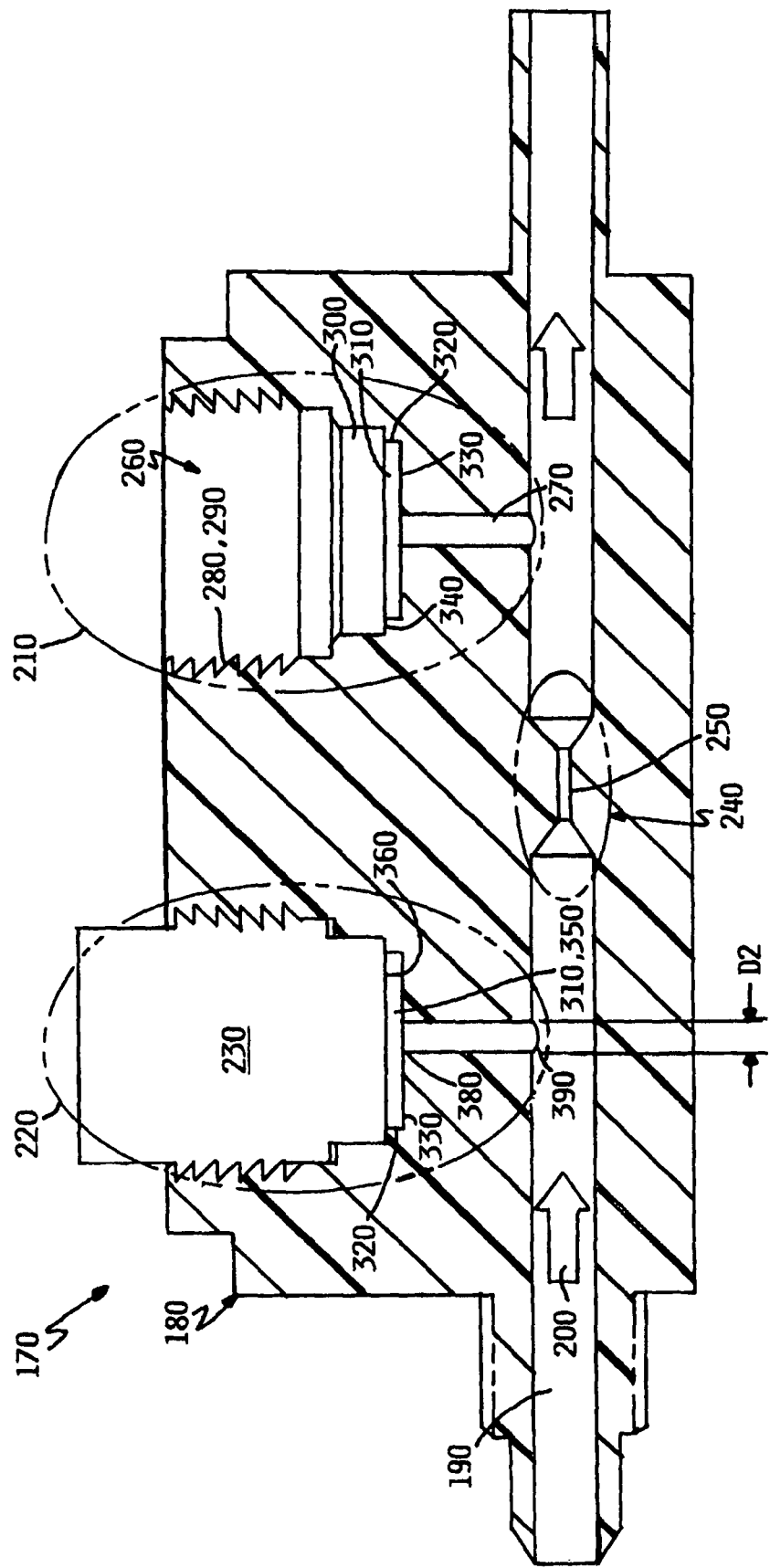
FIG. 3 is a cross-sectional elevation view of an embodiment of the present invention.
Figure 4:
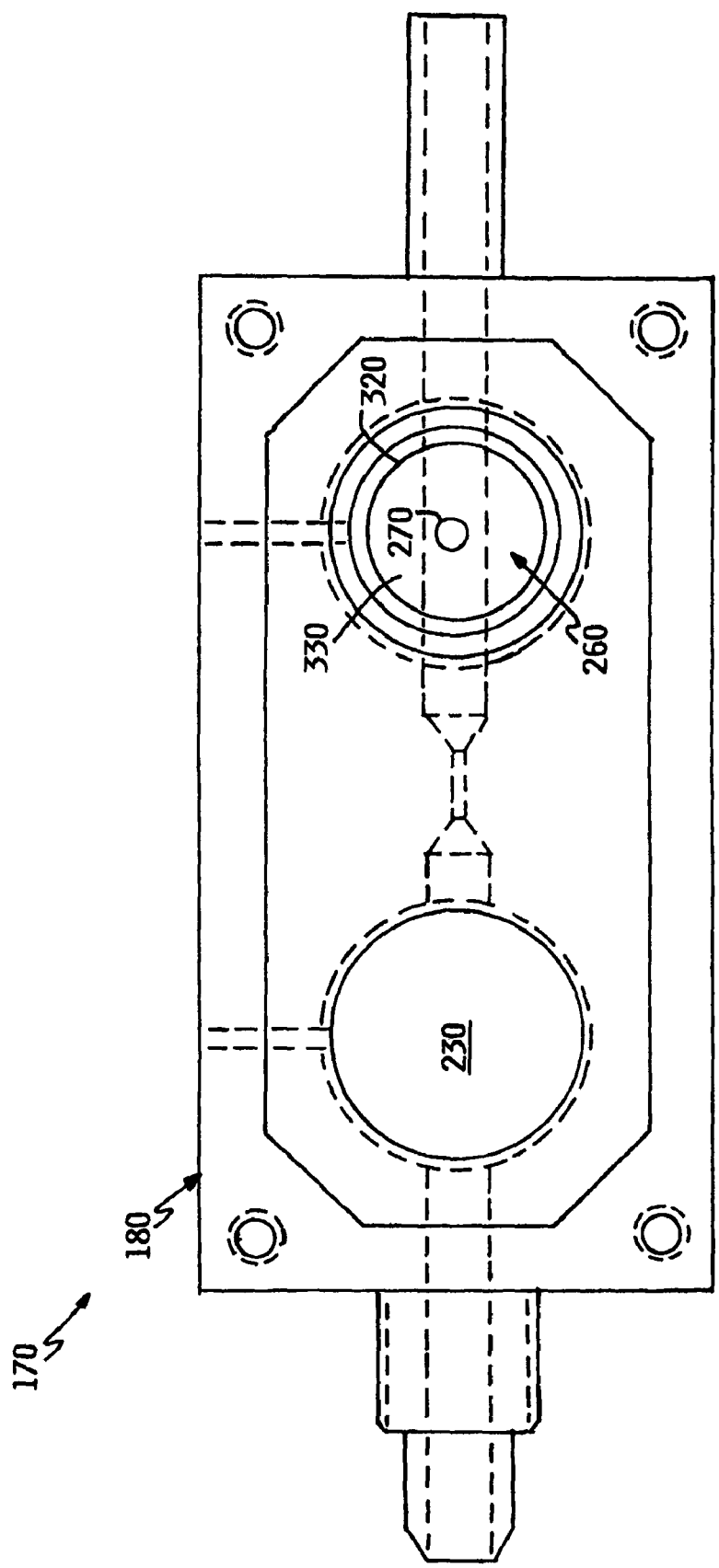
FIG. 4 is a plan view of an embodiment of the present invention.
Figure 5:
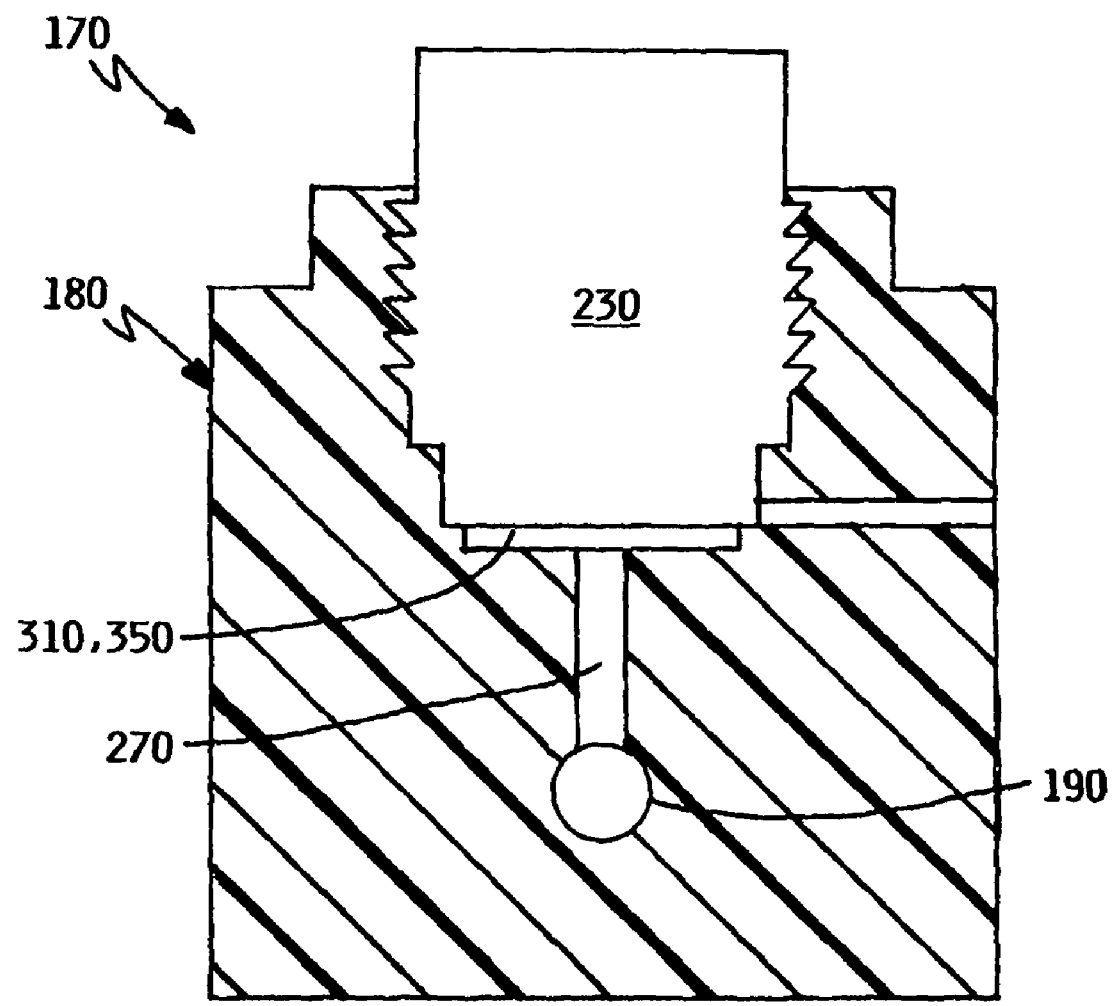
FIG. 5 is a cross-sectional end view of an embodiment of the present invention.

Referring now to FIGS. 3 through 5, an embodiment of the present invention is illustrated. The embodiment is presented in the context of an obstruction type flow meter 170 having a body 180, a flow passage 190 containing a process flow stream 200, two pressure taps 210 and 220, and two pressure sensors (only one, 230, being shown). The flow passage 190 includes an obstruction 240 in the form of a restricted diameter portion 250 located between the pressure taps 210 and 220. Each pressure tap 210, 220 includes a recess 260 and an impulse chamber 270 that establishes fluid communication between the flow passage 190 and the pressure sensor 230. The recess 260 has a sidewall 280 with screw threads 290 formed thereon, a collar portion 300 that necks down to a lower cavity 310 having a perimeter 320 and a bottom surface 330. A shoulder 340 is formed at the confluence of the collar portion 300 and the lower cavity 310. The pressure sensor 230 is disposed in the recess 260, and cooperates with the threads 290 to firmly seat the body of the sensor 230 against the shoulder 340.

A sensing chamber 350 is bounded on the sides and bottom by the perimeter 320, the bottom surface 330, respectively, of the lower cavity 310, and bounded on the top by the sensing face 360 of the seated pressure sensor 230. The cylindrical impulse chamber 270 has a diameter D2 and having a proximate end 380 and a distal end 390 is situated between the sensing chamber 350 and the flow passage 190. The proximate end 380 of the impulse chamber 270 is connected to the sensing chamber 350, and the distal end 390 is connected to the flow passage 190, thereby establishing fluid communication between the flow passage 190 and the sensing face 360 of the pressure sensor 230.

Figure 6:
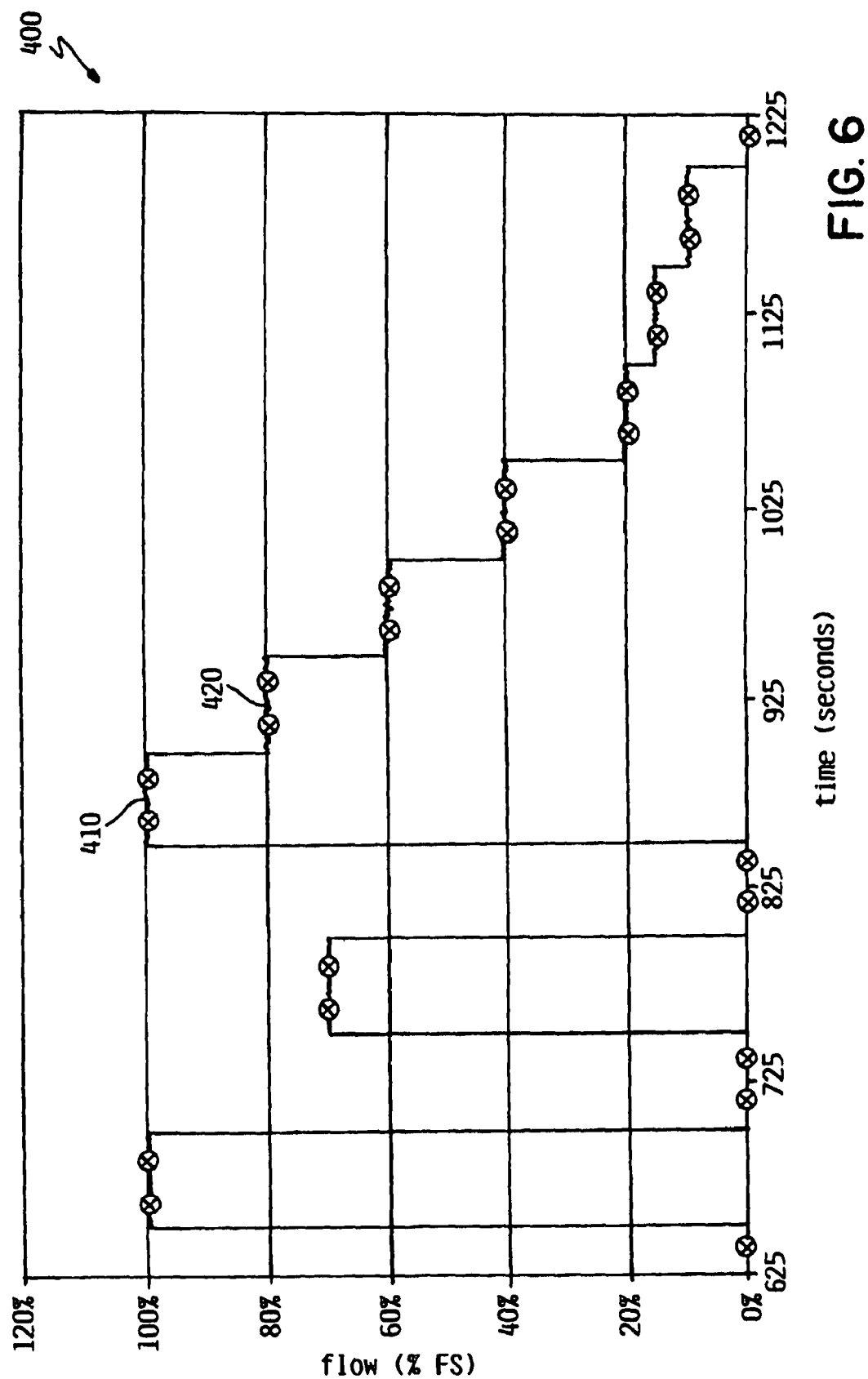
FIG. 6 is a graph depicting data from a cascade test using the flow meter body of the FIGS. 3 through 5 embodiment of the present invention.

The test procedure that was followed to generate the data presented in FIG. 2 was repeated for the FIG. 3 through 5 embodiment, again using sapphire strain gauge type pressure sensors. The results are presented in a graph 400 presented in FIG. 6. Again, the actual flow rate data set 410 and the measured flow rate data set 420 are designated by "O" and "X" markings, respectively. Note that, within the display resolution of the graph, there is no detectable bias in the flow measurement—a marked contrast to the graph 130 of FIG. 2. Note also that the random noise component of the measurement, which was quite prevalent at the 20%, 15% and 10% of full scale set points in FIG. 2, are greatly diminished in the presence of the impulse chamber geometry.

Conventional wisdom is that a long, narrow impulse chamber 270 (i.e. an orifice with a large aspect ratio) poses serious disadvantages when utilized with caustic fluids, especially when coupled with a sensing chamber 350 having a significantly larger diameter than the impulse chamber 270. The concern is that such geometries cannot be cleansed in an efficient manner in situ upon initial installation of the device, because geometries of large aspect ratios coupled with dead zones at the fluid/sensor interface remain stagnant during the cleaning process, thus retaining particulates as well as bacteria cells that will continue to propagate.

The present inventor, however, has discovered that a device using an impulse chamber 270 having an aspect ratio of 10 or less as disclosed herein is adequately cleansed of particles and contaminants within a reasonable and practicable length of time upon being placed in service. Furthermore, an aspect ratio of 3 is adequate in most cases to provide the desired noise and bias reduction effect. Thus, embodiments of the present invention utilize impulse chambers 370 having aspect ratios (AR), that is the ratio of the length of the chamber to diameter of the chamber, that are in the range of $3:1 \leq AR \leq 10:1$. As for the sensing chamber 350, it has been found if the volume of the sensing chamber 350 is 30% or less of the volume of the impulse chamber 270, techniques will adequately cleanse the pressure tap 210 upon initial service.

The present invention may be used in flow meters, such as disclosed for example in U.S. Pat. No. 5,672,832, hereby fully incorporated herein by reference, or integrated flow controllers such as is disclosed for example in U.S. Pat. No. 6,578,435, also hereby fully incorporated herein by reference.

Figure 7:
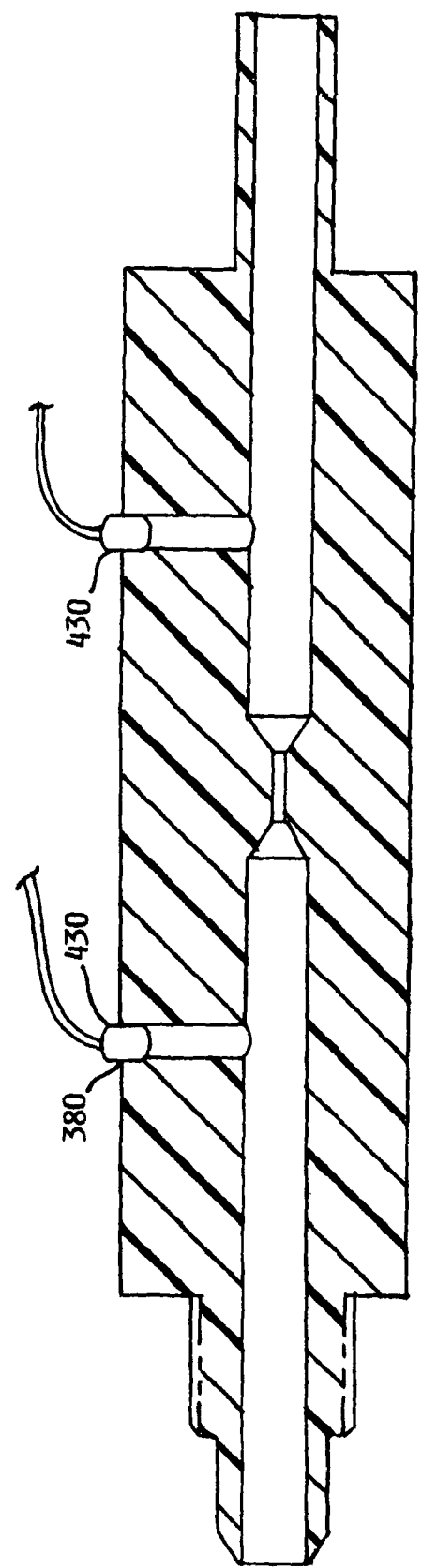
FIG. 7 is a cross-sectional elevation view of an embodiment of the present invention.

Pressure sensor technology has evolved in recent years such that the sensing element may be very small. Depending on the size of the flow channel in question, it may not be necessary to provide recesses with lower cavities that have larger diameters than the impulse chamber. Accordingly, referring to FIG. 7, an embodiment of the present invention is shown that does not utilize a sensing chamber. Rather, micro pressure sensors 430 are disposed directly into the proximate end 380 of the impulse chamber. This geometry further reduces cleansing concerns, as there is no sensing chamber creating a dead space for harboring particles and bacteria.

While the various chambers discussed above utilize right cylindrical geometries, it is predicted that chambers outlining various other shapes may be utilized to the same effect, such as a rectangular cube, a frustrum of a right circular cone, a converging/diverging nozzle, a clipped sphere, or other chamber shapes. For non-cylindrical chamber geometries, the hydraulic diameter $D_H$ is used to calculate the aspect ratio $AR_H$, i.e.

$$AR_H = L/D_H$$

The hydraulic diameter $D_H$ is defined as follows:

$$D_H = 4 \cdot (V/Aw)$$

where V is the volume of the chamber and Aw is the wetted area of the chamber walls. Note that when this formula is used for a right cylinder, $D_H = D$:

$$V = (\pi \cdot D^2 \cdot L)/4$$

$$Aw = \pi \cdot D \cdot L$$

$$\Rightarrow V/Aw = D/4$$

$$\Rightarrow D_H = 4 \cdot (D/4) = D$$

Also, while the above discussion and test data is directed at sapphire strain gauge type pressure sensors, the principles utilized may apply to transducers incorporating other fluid contact materials. Pressure sensors are generally sensitive to temperature changes. Hence, an artisan may still practice the present invention utilizing a different type of pressure measuring device.

In addition, the embodiments disclosed involve pressure measurements in the context of an obstruction type flow meter. It is anticipated that the invention disclosed, however, may be applicable to any pressure measurement.

The present invention may be embodied in other specific forms without departing from the spirit of the essential attributes thereof. Therefore, the example embodiments disclosed herein should be considered in all respects as illustrative and not restrictive, reference being made to the appended claims rather than to the foregoing description to indicate the scope of the invention.

What is claimed is:

1. A fluid handling device comprising:
a body portion defining a flow passage and an impulse chamber extending from the flow passage and being fluidly coupled therewith, the impulse chamber having a pair of opposing ends defining a length dimension therebetween and further presenting a diameter dimension transverse to the length dimension, wherein the length dimension is at least 3 times and not greater than 10 times the diameter dimension; and;
at least one sensor operably coupled with the body portion, the sensor disposed proximate the end of the impulse chamber opposite the flow passage and presenting a sensing face facing into the impulse chamber.

2. The device of claim 1, wherein the sensor is a pressure sensor.

3. The device of claim 2, wherein the pressure sensor is a sapphire strain-gauge sensor.

4. The device of claim 1, wherein the body portion further defines a sensing chamber at the end of the impulse chamber opposite the flow passage, and wherein the sensor is disposed facing into the sensing chamber.

5. The device of claim 4, wherein the impulse chamber defines a first volume and the sensing chamber defines a second volume, and wherein the second volume is not more than 30% of the first volume.

6. The device of claim 1, wherein the impulse chamber is a first impulse chamber and the body portion further defines a second impulse chamber spaced apart from the first impulse chamber, the second impulse chamber extending from the flow passage and being fluidly coupled therewith, the second impulse chamber having a pair of opposing ends defining a length dimension therebetween and further presenting a diameter dimension transverse to the length dimension, wherein the length dimension is at least 3 times and not greater than 10 times the diameter dimension, the device further comprising a second sensor operably coupled with the body portion, the second sensor disposed proximate the end of the second impulse chamber opposite the flow passage and presenting a sensing face facing into the second impulse chamber.

7. The device of claim 6, further comprising a flow restriction in the flow passage intermediate the first and second impulse chambers.

8. The device of claim 7, wherein the device is a flow controller.

9. The device of claim 7, wherein the device is a flow meter.

10. The device of claim 1, wherein the impulse chamber has a shape other than a right cylinder, and wherein the diameter dimension is a hydraulic diameter.

11. A fluid handling device comprising:
a body portion defining a flow passage and a pair of spaced apart impulse chambers fluidly coupled with the flow passage, each of the impulse chambers having a pair of opposing ends defining a length dimension therebetween and presenting a diameter dimension transverse to the length dimension, wherein the length dimension is at least 3 times and not greater than 10 times the diameter dimension; and;
a pair of sensors operably coupled with the body portion, each sensor disposed proximate the end of a separate one of the impulse chambers opposite the flow passage.

12. The device of claim 11, wherein the body portion further defines a sensing chamber at the end of each of each of the impulse chambers opposite the flow passage.

13. The device of claim 12, wherein each impulse chamber defines a first volume and each sensing chamber defines a second volume, and wherein the second volume is not more than 30% of the first volume.

14. The device of claim 11, wherein the impulse chambers have a shape other than a right cylinder, and wherein the diameter dimension is a hydraulic diameter.

15. The device of claim 11, wherein the device is a flow controller.

16. The device of claim 11, wherein the device is a flow meter.

17. The device of claim 11, wherein the sensors are pressure sensors.

18. The device of claim 17, wherein the pressure sensors are sapphire strain-gauge sensors.

19. A method of simultaneously alleviating thermally induced bias and signal noise while inhibiting particulate harboring and bacterial growth in a fluid handling device comprising:
providing a body portion;
defining a flow passage and a pair of spaced apart impulse chambers fluidly coupled with the flow passage in the body portion, each of the impulse chambers having a pair of opposing ends defining a length dimension therebetween and presenting a diameter dimension transverse to the length dimension, wherein the length dimension is at least 3 times and not greater than 10 times the diameter dimension; and;
disposing a sensor proximate the end of each one of the impulse chambers opposite the flow passage.

20. The method of claim 19, further comprising defining a sensing chamber in the body portion adjacent the end of each of each of the impulse chambers opposite the flow passage, the impulse chambers and the sensing chambers defined such that a volume of each sensing chamber is not more than 30% of a volume of the adjacent impulse chamber.

* * * * *